United States Patent [19]

Galperin

[11] Patent Number: 5,384,038
[45] Date of Patent: Jan. 24, 1995

[54] STABLE, HIGH-YIELD REFORMING CATALYST

[75] Inventor: Leonid B. Galperin, Chicago, Ill.

[73] Assignee: UOP, Des Plaines, Ill.

[21] Appl. No.: 194,973

[22] Filed: Feb. 14, 1994

Related U.S. Application Data

[62] Division of Ser. No. 974,544, Nov. 12, 1992, Pat. No. 5,314,854.

[51] Int. Cl.$^6$ .............................. C10G 35/095; C07C 5/00
[52] U.S. Cl. .................................... 208/138; 585/419; 585/482
[58] Field of Search ............... 208/137, 138, 139; 585/475, 476, 481, 482, 418, 419

[56] References Cited

U.S. PATENT DOCUMENTS

| | | | |
|---|---|---|---|
| 3,259,589 | 7/1966 | Michalko | 252/466 |
| 3,651,167 | 3/1972 | deRosset et al. | 260/681.5 |
| 3,897,368 | 7/1975 | Ohara et al. | 252/466 |
| 4,104,320 | 8/1978 | Bernard et al. | 260/673.5 |
| 4,677,094 | 6/1987 | Moser et al. | 502/227 |
| 4,786,625 | 11/1988 | Imai et al. | 502/326 |
| 4,914,068 | 4/1990 | Cross et al. | 502/74 |
| 4,992,158 | 2/1991 | Schweizer | 208/65 |

*Primary Examiner*—Helen M. S. Sneed
*Assistant Examiner*—Bekir L. Yildirim
*Attorney, Agent, or Firm*—Thomas K. McBride; John F. Spears, Jr.; Richard E. Conser

[57] ABSTRACT

A reforming process, selective for the dehydrocyclization of paraffins to aromatics, is effected using a bed of catalyst particles containing multiple Group VIII (8-10) noble metals having different gradients within the catalyst particles and a nonacidic large-pore molecular sieve. The use of this bed of catalyst particles results in greater selectivity of conversion of paraffins to aromatics and improved catalyst stability, particularly in the presence of small amounts of sulfur.

7 Claims, 4 Drawing Sheets

STABLE, HIGH-YIELD REFORMING CATALYST

CROSS REFERENCE TO RELATED APPLICATION

This application is a division of prior application Ser. No. 974,544, filed Nov. 12, 1992, Now U.S. Pat. No. 5,314,854 the contents of which are incorporated herein by reference thereto.

BACKGROUND OF THE INVENTION

1. Field of the Invention

This invention relates to a catalyst and process for the conversion of hydrocarbons, and more specifically for the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petro-chemical industry or gasoline components with high resistance to engine knock. Demand for aromatics is growing more rapidly than the supply of feedstocks for aromatics production. Moreover, the widespread removal of lead antiknock additive from gasoline, reformulation of gasoline for reduced emissions, and the rising demands of high-performance internal-combustion engines are increasing the required knock resistance of the gasoline component as measured by gasoline "octane" number. The catalytic reforming unit therefore must operate more efficiently at higher severity in order to meet these increasing aromatics and gasoline-octane needs. This trend creates a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in conventional reforming than other aromatization reactions. Considerable leverage exists for increasing desired product yields from catalytic reforming by promoting the dehydrocyclization reaction over the competing hydrocracking reaction while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. The increased sensitivity of these selective catalysts to sulfur in the feed also is known. Commercialization has been slow in coming and is limited in scope, however, in light of the special measures that must be taken to exclude sulfur from the process. There is a need for a more sulfur-tolerant reforming process which will utilize the high selectivity featured by these dehydrocyclization catalysts.

RELATED ART

The art discloses reforming with a broad range of catalysts containing large-pore zeolites and Group VIII metals. U.S. Pat. No. 4,104,320 (Bernard et al.) discloses dehydrocyclization with potassium-form L-zeolite charged with one or more dehydrogenating metals of Group VIII, but teaches that two metals would be introduced simultaneously and does not suggest the advantages of controlling the distribution of metal in the catalyst. U.S. Pat. No. 4,914,068 (Cross et al.) teaches a method of dispersing at least one Group VIII metal in the pores of a large pore zeolite, along with a specified amount of a non-platinum metal salt.

Non-uniform distribution of metal within a catalyst is known in the art. U.S. Pat. No. 3,259,589 (Michalko) discloses a variety of catalyst physical structures characterized by the placement of a layer of a metal component, but does not suggest that the metal component should comprise metals with different gradients. A surface-impregnated Group VIII noble metal component of a catalyst is taught in U.S. Pat. Nos. 3,651,167 (de Rosset et al.) and 3,897,368 (Ohara et al.), which do not suggest different gradients of different metals. U.S. Pat. No. 4,677,094 (Moser et al.) teaches a trimetallic catalyst comprising uniform platinum and tin and a surface-impregnated metal selected from one or more of rhodium, ruthenium, cobalt, nickel, and iridium, and teaches that the surface-impregnated component is incorporated into the catalyst support of an acidic catalyst. U.S. Pat. No. 4,786,625 (Imai et al.) teaches a catalytic composite comprising surface-impregnated platinum group metal and uniform tin, germanium, or rhenium on a refractory oxide support. U.S. Pat. No. 4,992,158 (Schweizer) teaches the introduction of platinum or palladium near the surface of preferably L-zeolite using Pt and/or Pd acetylacetonate; different gradients of different metals are not suggested, however. None of the above references anticipate or suggest a catalyst containing a nonacidic large-pore molecular sieve and two or more platinum-group metals having different gradients within the catalyst.

SUMMARY OF THE INVENTION

It is an object of the present invention to provide a catalyst system for a catalytic reforming process effective for the dehydrocyclization of paraffins with high catalyst activity and stability. A corollary objective is to avoid sulfur deactivation of a reforming catalyst in which high selectivity of paraffin dehydrocyclization generally is associated with unusual feed-sulfur intolerance.

This invention is based on the discovery that a bound L-zeolite catalyst containing a surface-layer palladium component and uniformly dispersed platinum results in substantial improvements in catalyst activity and stability as well as selectivity to aromatics in a catalytic reforming process.

A broad embodiment of the present invention is a bed of catalyst particles, selective for dehydrocyclization of paraffins, comprising a bound nonacidic large-pore molecular sieve and a multimetallic, multigradient Group VIII (8–10) ["Group VIII"] noble metal component. Preferably the metal component comprises uniformly dispersed platinum and another Group VIII metal as a surface-layer component. Most preferably, the surface-layer component comprises palladium and gradients of the metals are determined by SEM. Optimally, the nonacidic L-zeolite is potassium-form L-zeolite.

In another aspect, the invention is a reforming process, selective for dehydrocyclization of paraffins, using a bed of catalyst particles comprising a bound nonacidic large-pore molecular sieve and a multimetallic, multigradient Group VIII (8-10) ["Group VIII"] noble metal component.

These as well as other objects and embodiments will become apparent from the detailed description of the invention.

DESCRIPTION OF THE PREFERRED EMBODIMENTS

Figure 1:
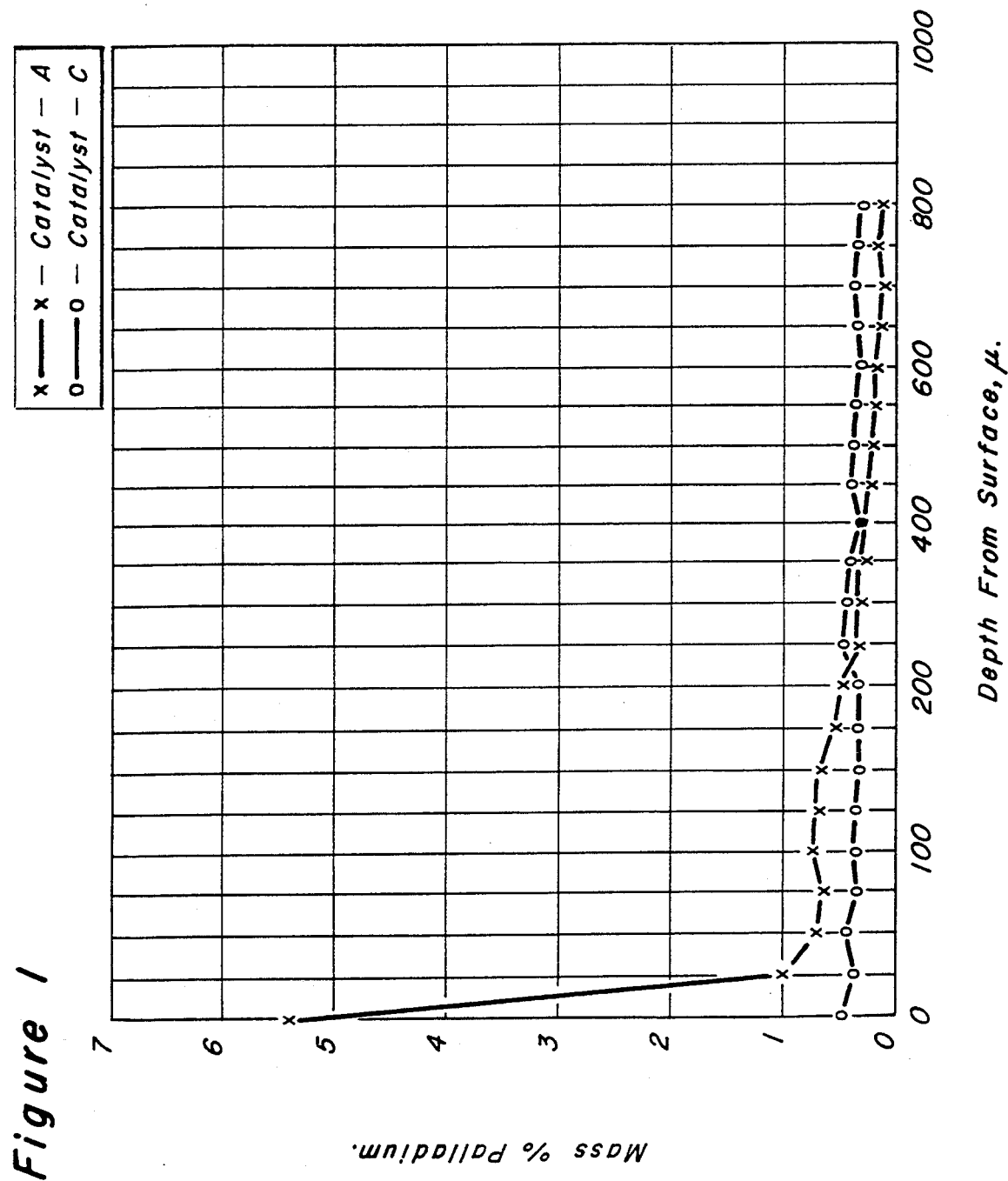
FIG. 1 shows the palladium gradient across the radius of catalyst particles in the preparations exemplified hereinafter, contrasting the palladium gradient of control catalyst particles of the prior art with that of catalyst particles of the invention.
Figure 2:
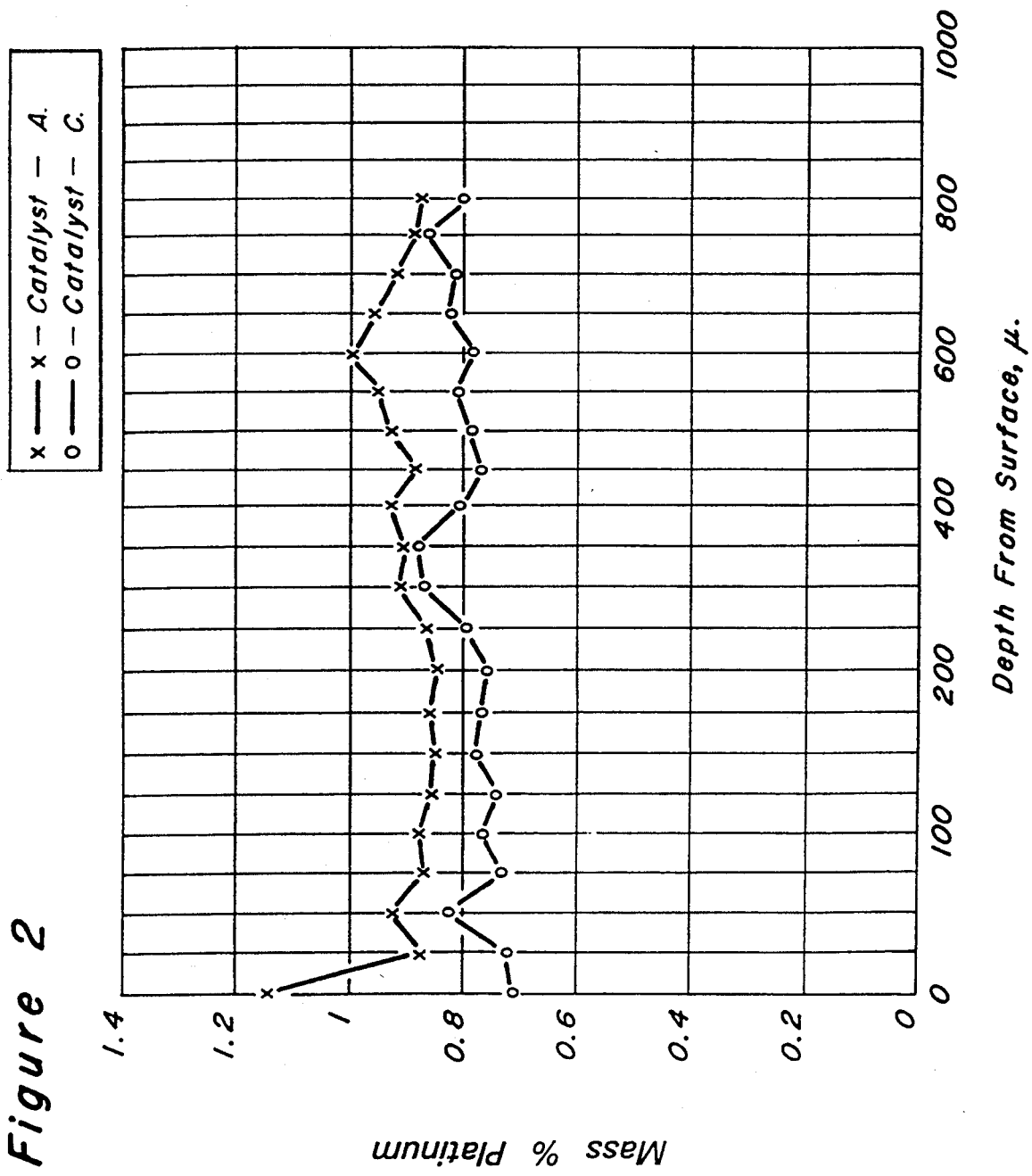
FIG. 2 shows the platinum gradient across the radius of catalyst particles for control catalyst particles of the prior art and for catalyst particles of the invention.

Broad embodiments of the present invention are directed to a bed of catalyst particles and reforming process using the bed of catalyst particles containing a nonacidic molecular sieve and two or more metals of Group VIII (8-10) of the periodic Table [See cotton and Wilkinson, *Advanced Organic Chemistry*, John Wiley & Sons (Fifth Edition, 1988)]["Group VIII noble metal"], at least one of the metals being present in the catalyst as a surface-layer component and at least one other metal being uniformly dispersed. The present reforming catalyst has been found to be surprisingly active and stable, in comparison to catalysts of the prior art, in reforming paraffinic feedstocks to achieve high yields of aromatics.

The invention is characterized for a bed of catalyst particles, such as would be contained in a reaction vessel in a process unit for hydrocarbon conversion. The "bed of catalyst particles" is defined as an aggregate of catalyst particles manufactured by substantially identical procedures in identical equipment from the same batches of raw materials. The preferred catalyst particle of the present invention is an extrudate, usually cylindrical in shape and having a diameter of about 0.8 to 3.2 mm (especially 1.5 to 2.2 mm) and a length to diameter ratio of about 1:1 to 5:1, with 2:1 to 3:1 being especially preferred. Other particle shapes known in the art are within the scope of the invention such as spheres, rods, pills, pellets, tablets or granules; spherical particles may be formed directly or from extrudates by rolling the extrudate particles on a spinning disk.

An essential component of the catalyst particles is a non-acidic large-pore molecular sieve. Suitable molecular sieves generally have a maximum free channel diameter or "pore size" of 6 Å or larger, and preferably have a moderately large pore size of about 7 to 8 Å. Such molecular sieves include those characterized as AFI, BEA, FAU or LTL structure type by the IUPAC Commission on Zeolite Nomenclature, with the LTL structure being preferred, it is essential that the preferred L-zeolite be non-acidic, as acidity in the zeolite lowers the selectivity to aromatics of the finished catalyst. In order to be "non-acidic," the zeolite has substantially all of its cationic exchange sites occupied by nonhydrogen species. Preferably the cations occupying the exchangeable cation sites will comprise one or more of the alkali metals, although other cationic species may be present. An especially preferred nonacidic L-zeolite is potassium-form L-zeolite.

It is necessary to composite the L-zeolite with a binder in order to provide a convenient form for use in the catalyst particles of the present invention. The art teaches that any refractory inorganic oxide binder is suitable. One or more of silica, alumina or magnesia are preferred binder materials of the present invention. Amorphous silica is especially preferred, and excellent results are obtained when using a synthetic white silica powder precipitated as ultra-fine spherical particles from a water solution. The silica binder preferably is nonacidic, contains less than 0.3 mass % sulfate salts, and has a BET surface area of from about 120 to 160 $m^2/g$.

The L-zeolite and binder may be composited to form particle shapes known to those skilled in the art such as spheres, extrudates, rods, pills, pellets, tablets or granules. Spherical particles may be formed directly by the oil-drop method as disclosed hereinbelow or from extrudates by rolling extrudate particles on a spinning disk. In one method of forming extrudates, potassium-form L-zeolite and amorphous silica are commingled as a uniform powder blend prior to introduction of a peptizing agent. An aqueous solution comprising sodium hydroxide is added to form an extrudable dough. The dough preferably will have a moisture content of from 30 to 50 mass % in order to form extrudates having acceptable integrity to withstand direct calcination. The resulting dough is extruded through a suitably shaped and sized die to form extrudate particles, which are dried and calcined generally by known methods. Preferably, extrudates are subjected directly to calcination without an intermediate drying step in order to encapsulate potassium ions and preserve basicity. The calcination of the extrudates is effected in an oxygen-containing atmosphere at a temperature of from about 260° to 650° C. for a period of about 0.5 to 2 hours.

An alternative alumina form of the present catalyst support is the sphere. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto.

A reforming-catalyst support may incorporate other porous, adsorptive, high-surface-area materials. Within the scope of the present invention are refractory supports containing one or more of: (1) refractory inorganic oxides such as alumina, silica, titania, magnesia, zirconia, chromia, thoria, boria or mixtures thereof; (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spineis such as $MgAl_2O_4$, $FeAl_2O_4$, $ZnAl_2O_4$, $CaAl_2O_4$; and (5) combinations of materials from one or more of these groups.

An alkali metal component is a highly preferred constituent of the reforming catalyst particles. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite as described hereinabove. Surface-deposited alkali metal also may be present as described in U.S. Pat. No. 4,619,906, incorporated herein by reference thereto.

An essential ingredient of catalyst particles of the invention is a multimetallic, multigradient Group VIII (8–10) ["Group VIII"] noble-metal component. "Multi-gradient" designates the differing distribution of two or more Group VIII noble metals in the catalyst particle. Preferably at least one metal is present as a "surface-layer" metal as described hereinbelow, while one or more other metals is uniformly dispersed throughout the catalyst particle. The characterization of the Group VIII noble metal as a "surface-layer" metal is intended to encompass a Group VIII noble-metal gradient upon and within the catalyst support as described hereinbelow.

Of the Group VIII noble metals, i.e., platinum, palladium, rhodium, ruthenium, osmium and iridium, palladium is a preferred surface-layer metal and platinum is preferred as the uniformly dispersed metal. Mixtures of Group VIII noble metals as the surface-layer and/or uniformly dispersed metals as also are within the scope of this invention. Each Group VIII noble-metal may exist within the final catalytic composite as a compound such as an oxide, sulfide, halide, or oxyhalide, in chemical combination with one or more of the other ingredients of the composite, or as an elemental metal. Best results are obtained when substantially all of the metals are present in the elemental state. Each of the metals may be present in the final catalyst composite in any amount which is catalytically effective, but relatively small amounts are preferred. Each of the surface-layer and the uniformly dispersed Group VIII noble-metals generally will comprise from about 0.01 to 5 mass % of the final catalyst, and preferably about 0.05 to 2 mass %, calculated on an elemental basis. The ratio of surface-layer to uniformly dispersed metal in a bed of catalyst particles usually is in the range of from about 20:1 to 1:50, and optimally from about 10:1 to 1:20, on an elemental mass basis.

The surface-layer metal comprises at least one Group VIII noble metal is concentrated in the surface layer of each catalyst particle. In defining the present invention, "layer" is a stratum of a catalyst particle of substantially uniform thickness at a substantially uniform distance from the surface of the catalyst particle. The "surface layer" is the layer of the catalyst particle adjacent to the surface of the particle. The concentration of surface-layer Group VIII noble metal tapers off in progressing from the surface to the center of the catalyst particle, and is substantially lower in the "central core" of the particle than in its surface layer. "Central core" is defined, in characterizing the present invention, as a core of a catalyst particle representing 50% of the diameter or, preferably, 50% of the volume of the particle. "Diameter" is defined as the minimum regular dimension through the center of the catalyst particle; for example, this dimension would be the diameter of the cylinder of an extrudate. For the preferred extrudates of the present invention, the central core is a concentric cylindrical portion excluding the surface layer at the side and ends of the cylindrical extrudate particles; a central core having 50% of the volume of the extrudate particle generally would have a diameter 70–75% of that of the particle. However, other quantitative criteria for measuring the gradient of metal concentration in a catalyst particle are not excluded thereby.

A "surface-layer" metal of the present catalyst has a concentration in the surface layer of the catalyst particle that is at least twice the concentration in the central core of the catalyst particle. Preferably, measurement of the surface-layer concentration is effected as the average of the concentration closest to the surface of at least three catalyst particles. More preferably, the surface-layer concentration of Group VIII noble metal is at least about three times the concentration in the central core. Alternatively, the surface-layer concentration is the average of measurements within a surface layer which is, for example, 100 microns deep. In thus characterizing the invention and as exemplified hereinbelow, the surface layer may be 50 or 100 microns deep or represent 10% or 20% of the radius of the catalyst particle. "Radius" is defined as the distance from the surface to the center of the catalyst particle, being half of the diameter of the particle. In an alternative definition, about 50% or more of a surface-layer metal is contained in the surface layer of a catalyst.

The surface-layer Group VIII noble metal may be incorporated into the catalyst particle in any manner suitable to effect a decreasing gradient of the metal from the surface to the center of the particle. Preferably, the metal is impregnated into the bound nonacidic zeolite as a compound which decomposes upon contact with the bound zeolite, releasing the metal at or near the surface of the particle. More preferably, a palladium component is impregnated as a compound, especially a salt, which decomposes at pH of about 5 or more. For example, the preferred palladium is impregnated as $Pd(NO_3)_2$ which decomposes upon contacting a bound L-zeolite. Without limiting the invention, other means include using a compound of the metal which complexes with or otherwise anchors to the bound zeolite or which does not penetrate into the interior of the particle. An example is a multi-dentated ligand, such as carboxylic acids or metal compounds containing amino groups, thiol groups, phosphorus groups or other polar groups which can bond strongly to an oxide support.

Alternatively, the surface-layer Group VIII noble metal may be incorporated into the catalyst by spray impregnation. One example of this would be to place a spray nozzle within a rotating drum which holds a catalyst support. A solution of the salt of the surface-layer metal is ejected from the nozzle using air to form fine droplets of spray, which contact the support in the rotating drum for effective mixing. The volume ratio of solution to support is sufficient to effect the desired concentration of surface-layer metal in the catalyst, and preferably would be from about 0.05 to 1.0.

The gradient of the Group VIII noble metals preferably is determined by Scanning Electron Microscopy ("SEM"). SEM determinations of local metal concentrations are effected on at least three sample particles from the bed. Samples are selected from the bed by techniques known to those of ordinary skill in the art. The SEM data show the approximate metals content of any one point within a catalyst particle, based on the metals distribution profile in relation to the quantity of support. The result of each analysis may not be based upon a zero point; attempting to integrate a distribution curve is not possible, and could lead to interpretation errors as the entire curve could be shifted either up or down. However, the data are useful for making relative comparisons of metal distributions.

The uniformly dispersed Group VIII noble metal representing an essential segment of the multigradient Group VIII noble-metal component may be incorporated in the porous carrier material in any suitable manner, such as coprecipitation, ion-exchange or impregnation. Platinum is the preferred uniformly dispersed metal, and optimally is incorporated into the catalyst utilizing a soluble, decomposable compound to impregnate the carrier material in a relatively uniform manner. For example, platinum may be added to the support by commingling the latter with an aqueous solution of chloroplatinic acid, ammonium chloroplatinate, bromoplatinic acid, platinum trichloride, platinum tetrachloride hydrate, platinum dichlorocarbonyl dichloride, tetramine platinum chloride, dinitrodiaminoplatinum, sodium tetranitroplatinate (11), and the like. The utilization of a chloride compound is preferred since it facilitates the uniform distribution of the metallic components throughout the carrier material. In addition, it is generally preferred to impregnate the carrier material after it has been calcined in order to minimize the risk of loss of the valuable Group VIII noble metal. Although it is within the scope of the invention that the surface-layer and uniformly dispersed Group VIII noble metals are incorporated into the catalyst simultaneously, any effective order of addition is acceptable and the surface-layer component can be added before or after addition of the uniformly dispersed metal. Optimally, the surface-layer component is incorporated into the catalyst prior to the addition of the uniformly dispersed metal with oxidation of the composite before addition of the latter metal.

As measured by SEM, a metal is considered uniformly dispersed if the metal concentration at one stratum from determinations on three or more particles differs by less than about 50% from the average metal concentration on the particles. Preferably, the difference between the metal concentration at any stratum and the average for the entire particles is less than about 25%.

It is within the scope of the present invention that the catalyst may contain other metal components known to modify the effect of the Group VIII noble-metal component. Such metal modifiers may include Group IVA (14) metals, rhenium, indium, gallium, manganese, zinc, uranium, dysprosium, thallium and mixtures thereof. Catalytically effective amounts of such metal modifiers may be incorporated into the catalyst by any means known in the art. Generally an optional metal modifier is present in a concentration of from about 0.01 to 5 mass % of the finished catalyst on an elemental basis. Preferably, the catalyst does not contain such metal modifiers.

The reforming catalyst may contain a halogen component. The halogen component may be either fluorine, chlorine, bromine or iodine or mixtures thereof with chlorine being preferred. Considering the nonacidic nature of the support, the halogen usually is incorporated into the catalyst only in association with the incorporation of a metal component. The halogen component is generally present in a combined state with the inorganic-oxide support. The halogen component is preferably well dispersed throughout the catalyst and may comprise from more than 0.2 to about 15 wt. %, calculated on an elemental basis, of the final catalyst.

The final reforming catalyst generally will be dried at a temperature of from about 100° to 320° C. for about 0.5 to 24 hours, followed by oxidation at a temperature of about 300° to 550° C. (preferably above about 350° C.) in an air atmosphere for 0.5 to 10 hours. Preferably the oxidized catalyst is subjected to a substantially water-free reduction step at a temperature of about 300° to 550° C. (preferably above about 350° C.) for 0.5 to 10 hours or more. The duration of the reduction step should be only as long as necessary to reduce the platinum, in order to avoid pre-deactivation of the catalyst, and may be performed in-situ as part of the plant startup if a dry atmosphere is maintained. Further details of the preparation and activation of embodiments of the sulfur-sensitive reforming catalyst are disclosed, e.g., in U.S. Pat. Nos. 4,619,906 (Lambert et al) and 4,822,762 (Ellig et al.), which are incorporated into this specification by reference thereto.

A hydrocarbon feedstock to the present reforming process comprises paraffins and naphthenes, and may comprise aromatics and small amounts of olefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40°–80° C. and a final boiling point of from about 160°–210° C., or it may represent a narrower range within a lower final boiling point. Light paraffinic feedstocks, such as naphthas from Middle East crudes having a final boiling point of from about 100°–160° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

The hydrocarbon feedstock to the present process may contain small amounts of sulfur compounds, amounting to generally less than 10 parts per million (ppm) on an elemental basis. Preferably the hydrocarbon feedstock has been prepared by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation. This pretreating preferably will employ a catalyst known to the art comprising an inorganic oxide support and metals selected from Groups VIB(6) and VIII(9–10). Alternatively or in addition to the conventional hydrotreating, the pretreating step may comprise contact with sorbents capable of removing sulfurous and other contaminants. These sorbents may include but are not limited to one or more of zinc oxide, iron sponge, high-surface-area sodium, high-surface-area alumina, nickel-on-alumina, activated carbons and molecular sieves. Preferably, the pretreating step will provide the reforming catalyst with a hydrocarbon feedstock having sulfur levels at least as low as disclosed in the prior art as desirable reforming feedstocks, e.g., 1 ppm to 0.1 ppm (100 ppb); sulfur levels of 0.5 to 0.15 ppm are usual in modern pretreating units.

Optionally, the hydrocarbon feedstock is essentially sulfur-free. Selective reforming catalysts for aromatization of paraffins are known to be highly sulfur-sensitive, and some benefit may be derived from a sulfur-free feedstock even when utilizing the present active, stable catalyst. Sulfur-free is defined as containing less than 20 parts per billion (ppb), and preferably less than 14 ppb, sulfur. In another aspect, sulfur-free is defined as containing no detectable sulfur. The repeatability of the American National Standard test ASTM D 4045-87 is 20 ppb at a sulfur level of 0.02 ppm (20 ppb), and "sulfur free" according to this test therefore would be defined as less than 20 ppb sulfur. It is believed, however, that one laboratory testing a series of similar samples can detect differences at lower sulfur levels, e.g., 10 $\mu$g/ml or 14 ppb sulfur.

Operating conditions used in the process of the present invention include a pressure of from about atmospheric to 60 atmospheres (absolute), with the preferred range being from atmospheric to 20 atmospheres and a pressure of below 10 atmospheres being especially preferred. Free hydrogen preferably is supplied to the process in an amount sufficient to correspond to a ratio of from about 0.1 to 10 moles of hydrogen per mole of hydrocarbon feedstock. By "free hydrogen" is meant molecular $H_2$, not combined in hydrocarbons or other compounds. Preferably, the reaction is carried out in the absence of added halogen. The volume of catalyst corresponds to a liquid hourly space velocity of from about 0.5 to 40 $hr^{-1}$. The operating temperature generally is in the range of 260° to 600° C. Temperature selection is influenced by product objectives, with higher temperatures effecting higher conversion to aromatics and light hydrocarbons. Hydrocarbon types in the feedstock also influence temperature selection, as naphthenes are largely dehydrogenated over the first portion of the reforming catalyst which the feedstock contacts with a concomitant sharp decline in temperature across the first catalyst bed due to the endothermic heat of reaction. The temperature generally is slowly increased during each period of operation to compensate for inevitable catalyst deactivation.

The reforming process may be effected in a reactor section comprising one reactor or in multiple reactors with provisions known in the art to adjust inlet temperatures to individual reactors. The feed may contact the catalyst system in each of the respective reactors in either upflow, downflow, or radial-flow mode. Since the preferred reforming process operates at relatively low pressure, the low pressure drop in a radial-flow reactor favors the radial-flow mode. As the predominant dehydrocyclization and dehydrogenation reactions are endothermic, the reactor section generally will comprise two or more reactors with interheating between reactors to compensate for the endothermic heat of reaction and maintain dehydrocyclization conditions.

The reforming process will produce an aromatics-rich effluent stream, with the aromatics content of the $C_5+$ portion of the effluent typically within the range of about 45 to 85 mass %. The composition of the aromatics will depend principally on the feedstock composition and operating conditions, and generally will consist principally of $C_6$–$C_{12}$ aromatics. Benzene, toluene and $C_8$ aromatics will be the primary aromatics produced from the preferred light naphtha and raffinate feedstocks.

Using techniques and equipment known in the art, the aromatics-rich effluent usually is passed through a cooling zone to a separation zone. In the separation zone, typically maintained at about 0° to 65° C., a hydrogen-rich gas is separated from a liquid phase. The resultant hydrogen-rich stream can then be recycled through suitable compressing means back to the first reforming zone. The liquid phase from the separation zone is normally withdrawn and processed in a fractionating system in order to adjust the concentration of light hydrocarbons and produce an aromatics-containing reformate product.

The reactor section usually is associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is fixed-bed reactors in a semiregenerative unit.

An optional embodiment of the present invention is reforming of the hydrocarbon feedstock with a physical mixture of the reforming catalyst and a sulfur sorbent. The mixture is contained either in a fixed-bed reactor or in a moving-bed reactor whereby catalyst may be continuously withdrawn and added. The sulfur sorbent should not only be effective for removal of small amounts of sulfur compounds from hydrocarbon streams at reforming-catalyst operating conditions, but also be compatible with the reforming catalyst in order to maintain the activity of the catalyst. The sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior art, it is believed, due to possible zinc contamination of associated reforming catalyst. The manganese oxides include $MnO$, $Mn_3O_4$, $Mn_2O_3$, $MnO_2$, $MnO_3$, and $Mn_2O_7$. The preferred manganese oxide is MnO (manganous oxide). The manganese component may be composited with a suitable binder such as clays, graphite, or inorganic oxides including one or more of alumina, silica, zirconia, magnesia, chromia or boria in order to provide a second particle for the physical mixture of the present catalyst system. Preferably, the manganese component is unbound and consists essentially of manganese oxide. Even more preferably the manganese component consists essentially of MnO, which has demonstrated excellent results for sulfur removal and has shown adequate particle strength without a binder for the second particle of the present invention.

In yet another alternative embodiment of the present invention, the physical mixture of reforming catalyst particles and sulfur sorbent is contained within the same catalyst particle. In this embodiment, the catalyst particles and sorbent may be ground or milled together or separately to form particles of suitable size, preferably less than 100 microns, and the particles are supported in a suitable matrix. Preferably, the matrix is selected from the inorganic oxides described hereinabove.

Other embodiments and variants encompassed by and within the spirit of the present invention as claimed will be apparent to the skilled routineer. Examples follow which illustrate certain specific embodiments, and these particularly should not be construed to limit the scope of the invention as set forth in the claims.

EXAMPLES

Three parameters are especially useful in evaluating reforming process and catalyst performance, particularly in evaluating catalysts for dehydrocyclization of paraffins. "Activity" is a measure of the catalyst's ability to convert reactants at a specified set of reaction conditions. "Selectivity" is an indication of the catalyst's ability to produce a high yield of the desired product. "Stability" is a measure of the catalyst's ability to maintain its activity and selectivity over time.

The examples illustrate the effect especially on reforming catalyst activity and stability in the presence of sulfur and on activity and selectivity in the absence of sulfur of utilizing a catalyst particles prepared in the manner disclosed in the present invention.

Example I

The feedstock on which catalyst comparisons were based was a raffinate from a combination of catalytic reforming followed by aromatics extraction to recover benzene, toluene and $C_8$ aromatics. The characteristics of the feedstock were as follows:

| Sp. gr. | 0.6896 |
|---|---|
| ASTM D-86, °C.: | |
| IBP | 70 |
| 10% | 77 |
| 50% | 86 |
| 50% | 108 |
| EP | 138 |
| Mass % | |
| Paraffins | 90.3 |
| Olefins | 0.1 |
| Naphthenes | 6.8 |
| Aromatics | 2.8 |

The above composition was used in tests indicated below with and without small amounts of sulfur present: Feedstock S contained about 0.4 ppm, or 400 ppb (parts per billion) sulfur, while Feedstock A contained less than 100 ppb sulfur.

Example II

Catalytic reforming tests were performed on the above raffinate feedstock using catalysts of the invention in comparison with catalysts of the known art. A basic catalyst as known in the art, not of the invention and containing a single Group VII (8–10) noble metal component consisting essentially of platinum, was used as a "Reference" catalyst, or Catalyst R. The platinum was impregnated as tetraamineplatinum chloride (TAPC) onto an extruded silica-bound L-zeolite support having a diameter of about 1.6 mm and an L/D (length-to-diameter) ratio of 2 to 3 to effect a platinum content of 0.82 mass %, on an elemental basis, of the finished catalyst. The catalyst was finished by oxychlorination at 350° C. in air, using an $HCl/Cl_2$ mixture, and reduction with hydrogen at 350° C.

A control Catalyst C, representing a bimetallic Group VIII (8–10) noble-metal catalyst not of the invention, was prepared from the same support as was used for Catalyst R. Platinum and palladium were coimpregnated onto the support to achieve a uniform distribution in an atomic ratio of about 1:1 of the two metals. A solution of $Pd(NO_3)_2$ and ethylenediaminetetraacetic acid (EDTA) was combined with TAPC and used to impregnate the L-zeolite/silica support. Catalyst C was finished by oxychlorination and reduction in the manner of Catalyst R. The finished catalyst particles had the following composition in mass %:

| Palladium | 0.436 |
|---|---|
| Platinum | 0.827 |
| Chloride | 0.48 |

Example III

A bed of catalyst particles of the invention was prepared by successive impregnation of palladium and platinum to provide an atomic ratio of about 1:1 on the same support used for the Reference and Control catalysts described hereinabove. The palladium was impregnated as $Pd(NO_3)_2$ and precipitated substantially on the surface of the support, which then was oxidized at 565° C. The oxidized support then was impregnated with TAPC to provide a substantially uniform distribution of platinum on the support. The palladium- and platinum-impregnated support was finished by oxychlorination and reduction in the manner of Catalyst R. The finished catalyst, designated as Catalyst A, had the following composition in mass %:

| Palladium | 0.404 |
|---|---|
| Platinum | 0.823 |
| Chloride | 0.43 |

Example IV

Catalyst particles C and A were evaluated by Scanning Election Microscopy (SEM). The purpose of this analysis was to identify the relative distribution of palladium and platinum across the radius of the catalyst particles. Three particles each of C and A were evaluated in order to provide reliable average data.

The SEM data shows the approximate metals content of any one point within the catalyst pill, as indicated hereinabove, based on the metals distribution profile in relation to the support. The data are useful for making relative comparisons of metal distributions.

FIG. 1 shows the relative distribution of palladium concentration across the 800-micron radius of the catalyst particles from the surface to the center of each particle. Control Catalyst C displayed a relatively even distribution of palladium, with no discernable trend in concentration across the particles. Catalyst A, in contrast, displayed an exceptionally high concentration of palladium on a relative basis in the surface layer of the catalyst particles. The concentration of palladium at the surface was an order of magnitude higher than the palladium content in the central core representing 50% of the volume of the catalyst. The average palladium concentration in 50- or 100-micron surface layers or surface layers representing 10% or 20% of the radius of the catalyst particle can be estimated to be 5-7 times or more that of the palladium content in the central core.

FIG. 1 shows the relative distribution of platinum concentration across the 800-micron radius of the catalyst particles. Both Catalysts C and A displayed a relatively even distribution of platinum, with most of the measurements falling within about 10% of the mean concentration and the extreme concentration being within about 25-30% of the mean. Platinum thus would be considered to be uniformly dispersed in both Catalysts C and A; Reference Catalyst R is prepared with the same platinum-impregnation step as Catalysts C and A and thus also features uniformly dispersed platinum.

To quantify the differences between the catalysts of the invention and of the prior art, the relative proportions of palladium in surface layers were calculated from the data presented in FIG. 1. The 100-micron surface layer represents about 27-28% of the volume of the extruded particle, and the proportion of palladium in the 100-micron surface layer of Control Catalyst C thus would be about 25-30%. In contrast, Catalyst A of the invention has 55-60% of its palladium content in the 100-micron surface layer The layer representing the outer 10% of the diameter of Catalyst A, 80 microns in depth, has about 50% or more of the palladium, and over 75% of the palladium is in the layer representing the outer 20% of the diameter of the catalyst.

Example V

Catalyst A was tested in catalytic reforming of a sulfur-containing raffinate feedstock in comparison with Control Catalyst C and a series of tests of Reference Catalyst R. The feedstock was as described above in Example 1 except that the raffinate contained about 400 ppb (parts per billion) of sulfur. Operating conditions were as follows:

| | |
|---|---|
| Pressure, atmospheres | 4.5 |
| Hydrogen/hydrocarbon, mol | 3 |
| Liquid hourly space velocity, hr$^{-1}$ | 2 |

Temperature was adjusted as required to achieve approximately 50 mass % conversion of $C_6+$. The comparative results are plotted in FIG. 3 and may be summarized as follows:

| Catalyst | A | C | R |
|---|---|---|---|
| Activity, °C. initial temperature | 451 | 482+ | 450 |
| Deactivation rate, °C./day | 3.1 | * | 4.2 |
| Aromatics selectivity, mass % | 83.3 | <<80 | 81.5 |

*Stable operation was not achieved with Catalyst C.

Figure 3:
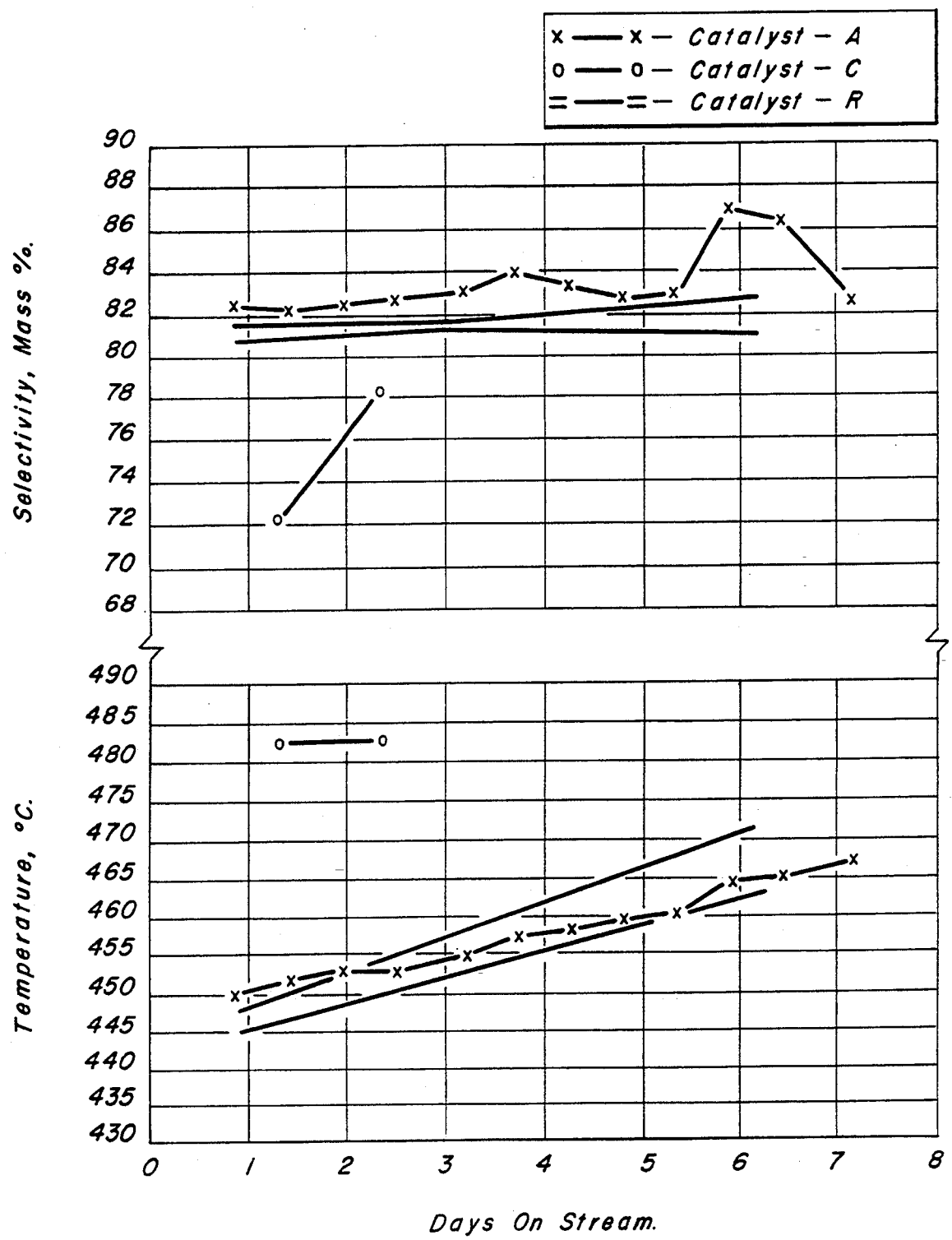
FIG. 3 shows the activity and stability, as well as overall selectivity to aromatics, in a reforming operation for a catalyst of the present invention in comparison to a prior-art control catalyst and a reference catalyst when processing a sulfur-containing feedstock.

Catalyst A of the invention thus demonstrated a significant improvement in stability and selectivity, with nearly the same activity, in comparison with the Reference platinum-only Catalyst R of the art when processing a sulfur-containing feedstock. The strong favorable effect of surface-layer palladium is shown in relation to Control Catalyst C, which never achieved a stable operation, as illustrated in FIG. 3.

Example VI

Catalyst A was tested in catalytic reforming of a low-sulfur raffinate feedstock in comparison with a series of tests of Reference Catalyst R. The feedstock was as described above in Example I without sulfur addition. Operating conditions were as follows:

| | |
|---|---|
| Pressure, atmospheres | 8 |
| Hydrogen/hydrocarbon, mol | 3 |
| Liquid hourly space velocity, hr$^{-1}$ | 3 |

Temperature was adjusted as required to achieve approximately 65 mass % conversion of $C_6+$. The comparative results are plotted in FIG. 4 and may be summarized as follows:

| Catalyst | A | R |
|---|---|---|
| Activity, °C. initial temperature | 494 | 492 |
| Deactivation rate, °C./day | 2.1 | 1.6 |
| Aromatics selectivity, mass % | 78.7 | 76.5 |

Figure 4:
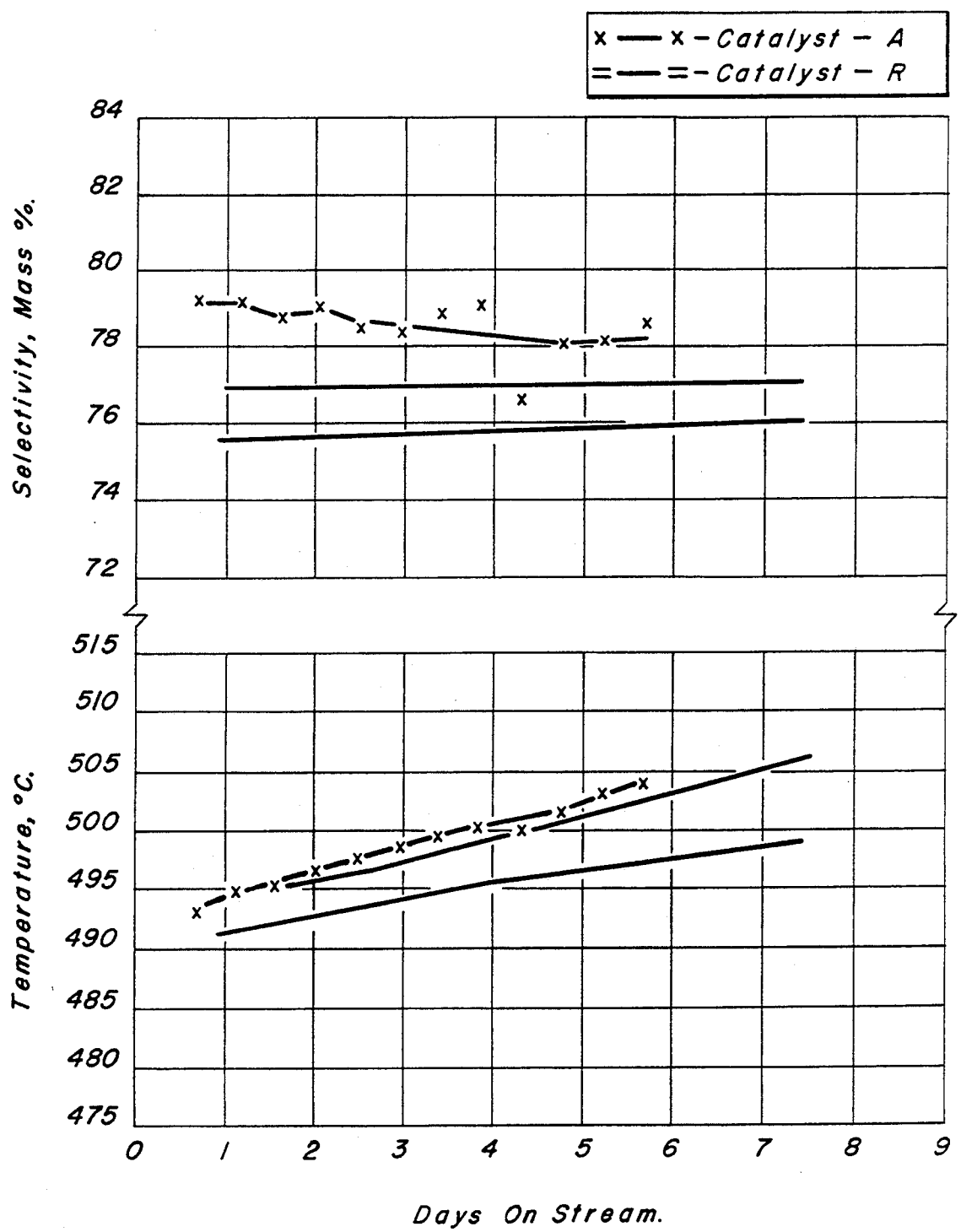
FIG. 4 shows the activity and stability, as well as overall selectivity to aromatics, in a reforming operation processing a low-sulfur feedstock for a catalyst of the present invention in comparison to a prior-art control catalyst.

Catalyst A of the invention thus demonstrated a significant improvement in selectivity, with nearly the same activity and a small loss in stability, in comparison with the Reference platinum-only Catalyst R of the art when processing a low-sulfur feedstock. The bed of catalyst particles of the invention thus demonstrates advantages in processing not only a sulfur-containing feedstock but also a low-sulfur feedstock as indicated in FIG. 4.

We claim:

1. A process for the reforming of a hydrocarbon feedstock comprising contacting a hydrocarbon feedstock at reforming conditions with a bed of catalyst particles to obtain an aromatics-rich effluent stream comprising:
   (a) a multigradient noble-metal component consisting essentially of uniformly dispersed platinum and surface-layer palladium;
   (b) a nonacidic large-pore molecular sieve; and,
   (c) an inorganic-oxide binder.

2. The process of claim 1 wherein the reforming conditions comprise an operating pressure of from about atmospheric to 10 atmospheres and a temperature of from about 260° to 600° C.

3. The process of claim 1 wherein the concentration of surface-layer palladium measured at the surface of the particles is at least twice the concentration of said palladium in the central core of the catalyst particles.

4. The process of claim 3 wherein the concentration of surface-layer metal measured at the surface of the particles is at least three times the concentration of said metal in the central core of the catalyst particles.

5. The process of claim 1 wherein the nonacidic large-pore molecular sieve comprises nonacidic L-zeolite.

6. The process of claim 1 wherein the binder comprises silica.

7. A process for the reforming of a hydrocarbon feedstock comprising contacting a hydrocarbon feedstock at reforming conditions with a bed of catalyst particles to obtain an aromatics-rich effluent stream comprising:
   (a) a multigradient noble-metal component consisting essentially of a uniformly dispersed platinum component and a surface-layer palladium component;
   (b) A nonacidic L-zeolite; and,
   (c) a silica binder.

* * * * *